(12) United States Patent
Li et al.

(10) Patent No.: US 11,055,307 B2
(45) Date of Patent: Jul. 6, 2021

(54) AUTOMATIC MODELING METHOD AND CLASSIFIER FOR OLAP DATA MODEL

(71) Applicant: SHANGHAI KYLIGENCE INFORMATION TECHNOLOGY Co., Ltd., Shanghai (CN)

(72) Inventors: Dong Li, Shanghai (CN); Yifan Zhang, Shanghai (CN); Yang Li, Shanghai (CN); Qing Han, Shanghai (CN)

(73) Assignee: SHANGHAI KYLIGENCE INFORMATION TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/769,397

(22) PCT Filed: Jan. 19, 2018

(86) PCT No.: PCT/CN2018/073320
§ 371 (c)(1),
(2) Date: Sep. 2, 2020

(87) PCT Pub. No.: WO2019/127744
PCT Pub. Date: Jul. 4, 2019

(65) Prior Publication Data
US 2020/0394201 A1 Dec. 17, 2020

(30) Foreign Application Priority Data
Dec. 29, 2017 (CN) .......................... 201711487470.5

(51) Int. Cl.
*G06F 16/25* (2019.01)
*G06F 16/28* (2019.01)
(Continued)

(52) U.S. Cl.
CPC ........ *G06F 16/254* (2019.01); *G06F 16/2282* (2019.01); *G06F 16/2455* (2019.01);
(Continued)

(58) Field of Classification Search
None
See application file for complete search history.

(56) References Cited

U.S. PATENT DOCUMENTS

| 7,571,182 B1 | 8/2009 | Eddy | |
|---|---|---|---|
| 2007/0122063 A1* | 5/2007 | Baba | .................. G06F 16/5838 382/305 |

(Continued)

FOREIGN PATENT DOCUMENTS

| CN | 105468702 A | 4/2016 |
|---|---|---|
| CN | 105930388 A | 9/2016 |

*Primary Examiner* — Alford W Kindred
*Assistant Examiner* — Cao D Vuong
(74) *Attorney, Agent, or Firm* — Craft Chu PLLC; Andrew W. Chu

(57) ABSTRACT

The automatic modeling method and a classifier for OLAP data model includes acquiring a SQL query statement; parsing the SQL query statement and judging whether any syntax error or lexical error exists in the SQL query statement; extracting query structures from the SQL query statement to obtain at least N sets of query patterns, if no syntax error or lexical error exists; classifying the at least N sets of query patterns; merging the query patterns in each class to obtain a corresponding pattern relation tree; and converting the pattern relation tree into a corresponding data model. The classifier includes a static rule classification module, and a statistical rule and preset learning rule classification module. A data model generated with the method and classifier provided in the present invention supports all inputted SQL query statements and has certain generic capabilities to full support Cube operations and quick queries.

4 Claims, 2 Drawing Sheets

(51) Int. Cl.
*G06F 16/22* (2019.01)
*G06N 20/00* (2019.01)
*G06F 16/2455* (2019.01)
*G06N 5/04* (2006.01)

(52) U.S. Cl.
CPC .......... *G06F 16/258* (2019.01); *G06F 16/285* (2019.01); *G06N 5/04* (2013.01); *G06N 20/00* (2019.01)

(56) References Cited

U.S. PATENT DOCUMENTS

2015/0363509 A1* 12/2015 Maghoul ................ G06F 16/33 707/722
2016/0371355 A1* 12/2016 Massari ................ G06F 16/25
2017/0031980 A1* 2/2017 Kamfonas ......... G06F 16/24556

* cited by examiner

AUTOMATIC MODELING METHOD AND CLASSIFIER FOR OLAP DATA MODEL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention belongs to the OLAP big data information field, and particularly relates to an automatic modeling method and a classifier for OLAP data model.

2. Description of Related Art Including Information Disclosed Under 37 CFR 1.97 and 37 CFR 1.98

In the data era, it is important topic in the business intelligence and data analysis domain to analyze massive and complex data by OLAP to assist business decision making; data models are right the basis for OLAP analysis.

Generally, the under-layer of OLAP analysis architecture is a data warehouse, which contains a series of data tables; the modeler designs data models for use by the analyst, on the basis of those tables according to the business analysis requirements; finally, all analytic operations of the analyst are converted into a series of SQL queries in the data tables. The data models endow business implications to the data tables, decouple the relationship between underlying data and business requirements, and are an indispensable part of the entire architecture.

In big data multi-dimensional analysis scenarios, the scale of data may be up to hundreds or even thousands of billions of data items; in addition, there are numerous dimensions and complex and varying business scenarios, causing increased difficulties in data modeling; in addition, since frequent changes to the data model are not advisable for the use of OLAP Cube, the difficulties in trial and error for data modeling are increased. All those factors bring big challenges to the modeler. Therefore, it is especially important to realize automatic modeling with computer algorithms, in order to reduce the cost of manual modeling.

BRIEF SUMMARY OF THE INVENTION

The technical problem to be solved in the present invention is: The implementation of the existing OLAP model highly relies on manual interpretation of data sheets and business requirements; consequently, the modeling efficiency is low, the modeling cost is high, and automatic modeling cannot be realized.

To solve the technical problem described above, the present invention provides an automatic modeling method for OLAP data model, which comprises:

S1. acquiring a SQL query statement;

S2. parsing the SQL query statement and judging whether any syntax error or lexical error exists in the SQL query statement according to a parsing result;

S3. extracting query structures from the SQL query statement according to column information and table information related with the source data used by the SQL query statement to obtain at least N sets of query patterns, if no syntax error or lexical error exists, where, N is a natural number greater than or equal to 1;

S4. classifying said at least N sets of query patterns;

S5. merging the query patterns in each class to obtain a corresponding pattern relation tree; and S6. converting the pattern relation tree into a corresponding data model.

The present invention has the following beneficial effects: With the above-mentioned method, an inputted SQL sample is parsed and characteristics are extracted, to find out patterns required for the data model; then, those patterns are clustered and merged to generate all required data models, which not only fully support all inputted SQL query statements, but also have certain generic capability. Besides, the generated data models fully support Cube operations and quick queries, and ensures that the Cube expansion ratio is lower than or equal to 10 times; in addition, the automatic modeling effectively decreases learning difficulties and trial-and-error costs for the user, and optimizes user experience.

Furthermore, the column information refers to all columns used in the SQL query statement, wherein, each column comprises: name of column, table of column, type of column, and number of occurrences of the column;

the table information refers to all tables used in the SQL query statement, wherein, each table comprises: name of table, type of table, and information on association between the table and a fact table.

Furthermore, the operation of classifying said at least N sets of query patterns in the step S4 comprises:

S41: judging the differences among said at least N sets of query patterns according to static rules, wherein, the static rules refer to: calculating the degree of difference between identical tables in any two sets of query patterns and judging whether the degree of difference between the identical tables is greater than a first preset threshold, and the two sets of query patterns cannot be classified into the same class if the degree of difference is greater than the first preset threshold;

and calculating the degree of difference between identical columns in any two sets of query patterns and judging whether the degree of difference is greater than the first preset threshold after the degree of difference between the tables are calculated, and the two sets of query patterns cannot be classified into the same class if the degree of difference is greater than the first preset threshold;

S42: performing clustering for said at least N sets of query patterns according to statistical rules and preset learning rules, after the differences are judged.

Furthermore, the operation of performing clustering of said at least N sets of query patterns according to statistical rules and preset learning rules in the step S42 comprises:

S421. calculating an eigenvector of each set of query patterns according to column information and table information used in each set of query patterns;

S422. performing clustering of the eigenvectors according to a clustering algorithm in unsupervised machine learning and the preset learning rules.

Furthermore, the preset learning rules refer to: judging whether the clustering result meets preset criteria after the clustering, and adjusting the clustering result with a supervised machine learning algorithm and logging the adjusted clustering result if the clustering result doesn't meet the preset criteria.

Furthermore, the operation of merging the query patterns in each class to obtain a corresponding pattern relation tree in the step S5 comprises:

calculating the degree of difference between identical tables in any two sets of query patterns in each class and judging whether the degree of difference is smaller than a second preset threshold, and merging the two sets of query pattern to obtain a corresponding pattern relation tree if the degree of difference is smaller than the second preset threshold; and calculating the degree of difference between identical columns in any two sets of query patterns in each class, judging whether the degree of difference is smaller than the second preset threshold, and merging the two sets of query patterns to obtain a corresponding pattern relation tree if the degree of difference is smaller than the second preset threshold, after the degree of difference between tables in each class is calculated.

Furthermore, the operation of converting the pattern relation tree into a corresponding data model in the step S6 comprises:

converting the table information in the pattern relation tree to corresponding table information in the data model; and converting the column information in the pattern relation tree into corresponding column information in the data model.

Furthermore, the operation of converting the column information in the pattern relation tree into corresponding column information in the data model further comprises:

carrying out partitioned scoring of the columns in the pattern relation tree, to ascertain partitioned columns in the data model, wherein, the partitioned scoring of the columns in the pattern relation tree is carried out with the following calculation formula:

$$\text{PartScore}(i) = \text{PartFunc}(\text{Score}(i), \text{Stats}(i)),$$

where, PartFunc( ) is the scoring function, Score(i) is the score of column (i) in each set of query patterns, Stats(i) is the characteristic statistical value of column (i), and, if the partitioned score (i) of column (PartScore (i)) exceeds a preset score threshold, the column (i) will be set as a partitioned column.

The present invention further relates to a classifier, which comprises: a static rule classification module, and a statistical rule and preset learning rule classification module; wherein, the static rule classification module is configured to judge the differences between any two sets of query patterns among said at least N sets of query patterns according to static rules, wherein, the static rules refer to: calculating the degree of difference between identical tables in any two sets of query patterns and judging whether the degree of difference between the identical tables is greater than a first preset threshold, and the two sets of query patterns cannot be classified into the same class if the degree of difference is greater than the first preset threshold, where, N is a natural number greater than or equal to 1;

and calculating the degree of difference between identical columns in any two sets of query patterns and judging whether the degree of difference is greater than the first preset threshold after the degree of difference between the tables are calculated, and the two sets of query patterns cannot be classified into the same class if the degree of difference is greater than the first preset threshold;

the statistical rule and preset learning rule classification module is configured to perform clustering of said at least N sets of query patterns according to statistical rules and preset learning rules, after the differences are judged.

The present invention has the following beneficial effects: With the above-mentioned classifier, a plurality of query patterns can be classified, and the accuracy of classification can be improved.

Furthermore, the preset learning rules refer to: judging whether the clustering result meets preset criteria after the clustering, and adjusting the clustering result with a supervised machine learning algorithm and logging the adjusted clustering result if the clustering result doesn't meet the preset criteria.

DETAILED DESCRIPTION OF THE INVENTION

Hereunder the principle and features of the present invention will be detailed with reference to the accompanying drawings. However, it should be noted that the embodiments are provided only to interpret the present invention but don't constitute any limitation to the scope of the present invention.

Figure 1:
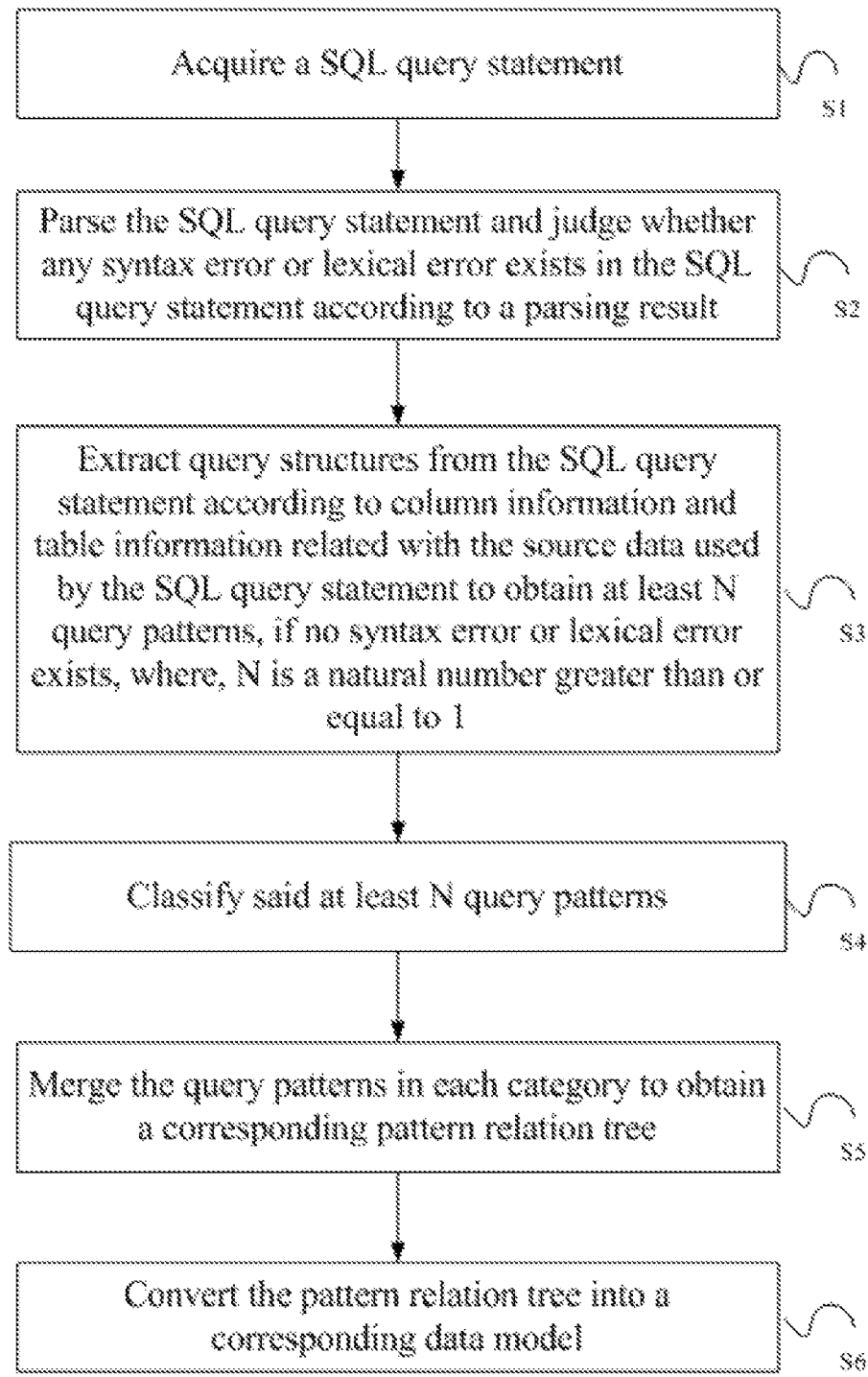
FIG. 1 is a flow chart of the automatic modeling method for OLAP data model according to the present invention.

As shown in FIG. 1, the automatic modeling method for OLAP data model comprises:

S1. acquiring a SQL query statement;

S2. parsing the SQL query statement and judging whether any syntax error or lexical error exists in the SQL query statement according to a parsing result;

S3. extracting query structures from the SQL query statement according to column information and table information related with the source data used by the SQL query statement to obtain at least N sets of query patterns, if no syntax error or lexical error exists, where, N is a natural number greater than or equal to 1;

S4. classifying said at least N sets of query patterns;

S5. merging the query patterns in each class to obtain a corresponding pattern relation tree; and S6. converting the pattern relation tree into a corresponding data model.

It can be understood: in this embodiment, the step S1 is to pre-check the acquired SQL query statement, so that each inputted SQL query statement is tested to check whether it can be effectively used in the subsequent stages; the step S2 is to use a SQL syntax parser to parse the inputted SQL query statement and judge whether there is any lexical error or syntax error in each SQL query statement; if any lexical error or syntax error exists, a clear error warning will be provided to guide the user to correct the SQL query statement. If the SQL query statement passes all checks, the next step S3 can be executed.

The step S3 is to execute the inputted SQL query statement in a simulated manner. The engine doesn't return any meaningful query result; rather, it collects the analytical result of the query plan in the execution process and convert the SQL query statement into a set of query patterns. It should be noted: may SQL query statements contain: a plurality of sub-queries (e.g., in a SQL query statement that contains sub-queries, each sub-query and the main query correspond to a context (i.e., a query structure)), a query pattern is generated for each context; therefore, a plurality of query patterns may be generated for each SQL query statement. For example, if the inputted SQL query statement is:

select sellers.seller_name, order.location, sum(order.price) from order join sellers on sellers.id=order.seller_id where order.time=20120101 group by sellers.seller_name, order.location, for the SQL query statement, the extracted corresponding query pattern structure is:

Column information:
Col(0): sellers.seller_name-name(0): seller_name, tbl(0): sellers, Cat(0): dimension, Score(0): calculated on the basis of the frequency of occurrence (1) and purpose (group by).
Col(1): order.location-name(1): location, tbl(1): order, Cat(1): dimension, Score(1): calculated on the basis of the frequency of occurrence (1) and purpose (group by).
Col(2): order.price-name(2): price, tbl(2): order, Cat(2): measurement, Score(2): calculated on the basis of the frequency of occurrence (1) and purpose (measurement).
Col(3): order.time-name(3): time, tbl(3): order, Cat(3): dimension, Score(3): calculated on the basis of the frequency of occurrence (1) and purpose (filter).
Table information:
Tbl(0): order-Name(0): order, Cat(0): fact table
Tbl(1): sellers-Name(1): sellers, Cat(1): dimension table, join(1): order join sellers on sellers.id=order.seller_id.

Query structures are extracted from the SQL query statement according to the above column information and table information, to obtain at least N sets of query patterns.

In addition, the step S4 is to classify said at least N sets of query patterns;

For example, suppose two query patterns are classified into the same class, as follows:

Pattern 1:
Column information:
Col(0): sellers.seller_name-name(0): seller_name, tbl(0): sellers, Cat(0): dimension, Score(0): calculated on the basis of the frequency of occurrence (1) and purpose (group by).
Col(1): order.location-name(1): location, tbl(1): order, Cat(1): dimension, Score(1): calculated on the basis of the frequency of occurrence (1) and purpose (group by).
Col(2): order.price-name(2): price, tbl(2): order, Cat(2): measurement, Score(2): calculated on the basis of the frequency of occurrence (1) and purpose (measurement).
Table information:
Tbl(0): order-Name(0): order, Cat(0): fact table
Tbl(1): sellers-Name(1): sellers, Cat(1): dimension table, join(1): order join sellers on sellers.id=order.seller_id Pattern 2:
Column information:
Col(0): order.time-name(0): time, tbl(0): order, Cat(0): dimension, Score(0): calculated on the basis of the frequency of occurrence (1) and purpose (filter);
Col(1): buyers.buyer_name-name(1): buyer_name, tbl(1): buyers,
Cat(1): dimension, Score(1): calculated on the basis of frequency of occurrence (1) and purpose (group by);
Table information:
Tbl(0): order-Name(0): order, Cat(0): fact table;
Tbl(1): buyers-Name(1): buyers, Cat(1): dimension table, join(1): order join buyers on buyers.id=order.buyer_id;

In the step S5, the query patterns in each class are merged to obtain a corresponding pattern relation tree, as shown in the following merging process, in which a union set is obtained:
Column information:
Col(0): sellers.seller_name-name(0): seller_name, tbl(0): sellers, Cat(0): dimension, Score(0): calculated on the basis of the frequency of occurrence (1) and purpose (group by);
Col(1): order.location-name(1): location, tbl(1): order, Cat(1): dimension, Score(1): calculated on the basis of the frequency of occurrence (1) and purpose (group by);
Col(2): order.price-name(2): price, tbl(2): order, Cat(2): measurement, Score(2): calculated on the basis of the frequency of occurrence (1) and purpose (measurement);
Col(3): order.time-name(3): time, tbl(3): order, Cat(3): dimension, Score(3): calculated on the basis of the frequency of occurrence (1) and purpose (filter);
Col(4): buyers.buyer_name-name(4): buyer_name, tbl(4): buyers, Cat(4): dimension, Score(4): calculated on the basis of the frequency of occurrence (1) and purpose (group by);
Table information:
Tbl(0): order-Name(0): order, Cat(0): fact table
Tbl(1): sellers-Name(1): sellers, Cat(1): dimension table, join(1): order join sellers on sellers.id=order.seller_id
Tbl(2): buyers-Name(2): buyers, Cat(2): dimension table, join(2): order join buyers on buyers.id=order.buyer_id.

Finally, in the step S6, the query patterns are classified, and a pattern relation tree is generated. A data model is generated from each pattern relation tree in that step.

The process from a pattern relation tree to a data model mainly involves data conversion, i.e., the table information (e.g., fact tables, dimension tables, JOIN, etc.) in the pattern relation tree is directly converted into table information in the data model; likewise, the column information (dimensions, measurements, and calculation columns, etc.) in the pattern relation tree is directly converted into column information in the data model. Therefore, after a set of data models are created successfully, those data models can jointly support a set of SQL queries and the business analysis demand behind the SQL queries.

Optionally, in an embodiment 2, the column information refers to all columns used in the SQL query statement, wherein, each column comprises: name of column, table of column, type of column, and number of occurrences of the column;

the table information refers to all tables used in the SQL query statement, wherein, each table comprises: name of table, type of table, and information on association between the table and a fact table.

It can be understood: in this embodiment 2, all column information (denoted as Col(i)) used in the SQL query statement contain all columns used in the context. The following records are saved for each column: Name(i), which represents the name of the column; Tab(i), which represents the table where the column is; Cat(i), which represents the type of the column, such as dimension, measurement, or calculation column, etc.; Score(i), which represents a score calculated on the basis of the frequency of occurrence and purpose of the column, etc. Table information (denoted as Tab(j)) contains all tables used in the context. The following records are saved for each table: Name(j), which represents the name of the table; Cat(j), which represents the type of the table, such as fact table or dimension table, etc.; Join(j), which represents the JOIN information between the table and a fact table, including JOIN type and JOIN condition.

Optionally, in an embodiment 3, the operation of classifying said at least N sets of query patterns in the step S4 comprises:

S41: judging the differences among said at least N sets of query patterns according to static rules, wherein, the static rules refer to: calculating the degree of difference between identical or identically labeled or analogous tables in any two sets of query patterns and judging whether the degree of difference between the identical or identically labeled or analogous tables is greater than a first preset threshold, and the two sets of query patterns cannot be classified into the same class if the degree of difference is greater than the first preset threshold;

and calculating the degree of difference between identical or identically labeled or analogous columns in any two sets of query patterns and judging whether the degree of difference is greater than the first preset threshold after the degree of difference between the tables are calculated, and the two sets of query patterns cannot be classified into the same class if the degree of difference is greater than the first preset threshold;

S42: performing clustering for said at least N sets of query patterns according to statistical rules and preset learning rules, after the differences are judged.

It can be understood: in this embodiment 3, since a data model serves for a plurality of queries, the query patterns must be classified, so that each class of query patterns can jointly generate a data model that support those queries. Generally, query patterns are classified according a variety of rules, including static rules, which contain a series of mutual exclusion rules, i.e., two patterns that meet certain conditions cannot be classified into the same class. The rules mainly include:

Calculating degree of difference Diff(i,j) between identical tables in two query patterns; two query patterns cannot be classified into the same class if the degree of difference between the tables is greater than a preset threshold;

Calculating degree of difference Diff(i,j) between identical columns in two query patterns; two query patterns cannot be classified into the same class if the degree of difference between the columns is greater than the preset threshold.

Clustering is performed for said at least N query patterns according to statistical rules and preset learning rules, after the differences are judged.

Optionally, in an embodiment 4, the operation of performing clustering of said at least N sets of query patterns according to statistical rules and preset learning rules in the step S42 comprises:

S421. calculating an eigenvector of each set of query patterns according to column information and table information used in each set of query patterns;

S422 performing clustering of the eigenvectors according to a clustering algorithm in unsupervised machine learning and the preset learning rules.

It can be understood: in the embodiment 3, after the judgment is made according to static rules, eigenvectors are calculated on the basis of all column information and table information in the query patterns, for example:

X(i)=(col1, col2, col3, . . . , colN, tab1, tab2, . . . , tabM), wherein, each colX represents the Score(X) of column Col(X), and each tabY represents the Score(Y) of table Tab(Y). Then, clustering is performed for those eigenvectors with a clustering algorithm in unsupervised machine learning, and finally all of the query patterns are classified into several classes.

Optionally, in an embodiment 5, the preset learning rules refer to: judging whether the clustering result meets preset criteria after the clustering, and adjusting the clustering result with a supervised machine learning algorithm and logging the adjusted clustering result if the clustering result doesn't meet the preset criteria.

It can be understood: in the embodiment 5, the result generated according to the learning rules ("static rules" and "statistical rules") are a recommended result, which may be adjusted or corrected by the user manually after the classification result is obtained; for example, though some query patterns may be classified into the same class after they are judged according to "static rules" and "statistical rules", the user may modify the result manually so that they are not classified into the same class, in view of business requirements, etc. The "learning rules" stores all final classification results confirmed by the user, and use supervised machine learning to train an appropriate classification model, predict whether a set of patterns can be classified into a class, and adjust the clustering result on the basis of the result of prediction.

Optionally, in an embodiment 6, the operation of merging the query patterns in each class to obtain a corresponding pattern relation tree in the step S5 comprises:

calculating the degree of difference between identical tables in any two sets of query patterns in each class and judging whether the degree of difference is smaller than a second preset threshold, and merging the two sets of query pattern to obtain a corresponding pattern relation tree if the degree of difference is smaller than the second preset threshold; and calculating the degree of difference between identical columns in any two sets of query patterns in each class, judging whether the degree of difference is smaller than the second preset threshold, and merging the two sets of query patterns to obtain a corresponding pattern relation tree if the degree of difference is smaller than the second preset threshold, after the degree of difference between tables in each class is calculated.

It can be understood: in the embodiment 6, after all of the query patterns are classified into several classes, the plurality of query patterns in each class are merged, according to the following rules:

Calculating degree of difference Diff(i,j) between identical tables in two patterns; if the degree of difference is smaller than a preset threshold, it indicates that the two tables correspond to the same data table, and can be merged, and the Cat(m) after the merging is determined by a selection function FuncSelect( ), i.e., Cat(j)=FuncSelect(Cat(i),Cat(j)); the merged Score (m) is Score(m)=Score(i)+Score(j).

The degree of difference Diff(i,j) between identical columns in two patterns is calculated; if the degree of difference is smaller than a preset threshold, it indicates that the two columns correspond to the same column in the same data table and can be aggregated, and the Cat(m) after the merging is determined by a selection function FuncSelect( ), i.e., Cat(j)=FuncSelect(Cat(i),Cat(j)); the merged Score (m) is Score(m)=Score(i)+Score(j).

Finally, the structure formed after the query patterns in each class are merged contains a set of tables and their JOIN relation tree, and defines columns selected in each table. Such a structure is referred to as a pattern relation tree.

Optionally, in an embodiment 7, the operation of converting the pattern relation tree into a corresponding data model in the step S6 comprises:

converting the table information in the pattern relation tree to corresponding table information in the data model; and converting the column information in the pattern relation tree into corresponding column information in the data model.

Optionally, in an embodiment 8, the operation of converting the column information in the pattern relation tree into corresponding column information in the data model further comprises:

carrying out partitioned scoring of the columns in the pattern relation tree, to ascertain partitioned columns in the data model, wherein, the partitioned scoring of the columns in the pattern relation tree is carried out with the following calculation formula:

PartScore(i)=PartFunc(Score(i), Stats(i)), where, PartFunc( ) is the scoring function, Score(i) is the score of column (i) in each set of query patterns, Stats(i) is the characteristic statistical value (i.e., statistical value of data characteristic) of column (i), and, if the partitioned score (i) of column PartScore(i) exceeds a preset score threshold, the column (i) will be set as a partitioned column.

It can be understood: the embodiment 8 provides a scheme for implementing another embodiment on the basis of the embodiment 7.

Figure 2:
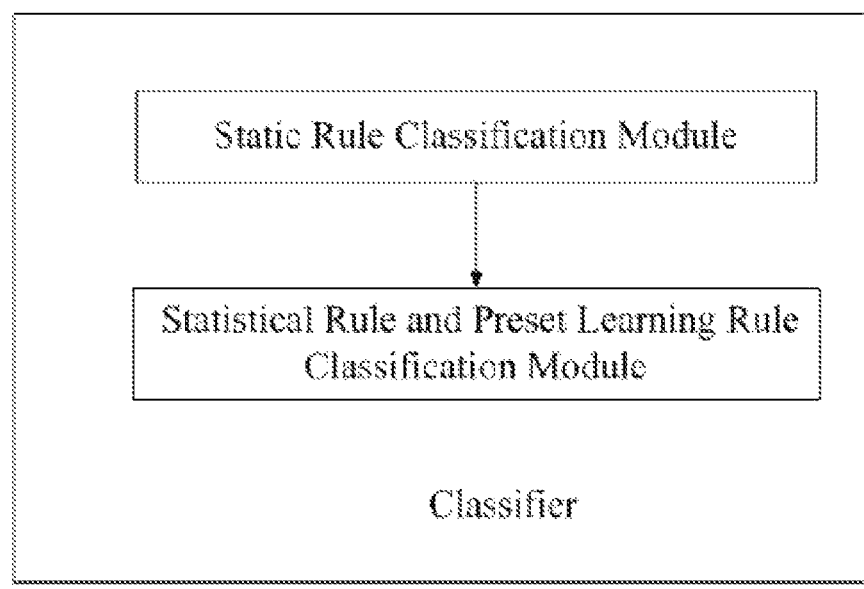
FIG. 2 is a schematic view of a structural diagram of the classifier according to the present invention.

As shown in FIG. 2, the embodiment 9 of the present invention further relates to a classifier, which comprises: a static rule classification module, and a statistical rule and preset learning rule classification module; wherein, the static rule classification module is configured to judge the differences between any two sets of query patterns among said at least N sets of query patterns according to static rules, wherein, the static rules refer to: calculating the degree of difference between identical tables in any two sets of query patterns and judging whether the degree of difference between the identical tables is greater than a first preset threshold, and the two sets of query patterns cannot be classified into the same class if the degree of difference is greater than the first preset threshold;

and calculating the degree of difference between identical columns in any two sets of query patterns and judging whether the degree of difference is greater than the first preset threshold after the degree of difference between the tables are calculated, and the two sets of query patterns cannot be classified into the same class if the degree of difference is greater than the first preset threshold;

the statistical rule and preset learning rule classification module is configured to perform clustering of said at least N sets of query patterns according to statistical rules and preset learning rules, after the differences are judged.

It can be understood: in this embodiment 9, the query patterns are classified with a classifier. Specifically, the query patterns are classified according to three types of rules: first, static rules are applied; the static rules contains a series of mutual exclusion rules, i.e., two patterns that meet certain conditions cannot be classified into the same class, mainly including: calculating degree of difference Diff(i,j) between identical tables in two query patterns; two query patterns cannot be classified into the same class if the degree of difference between the tables is greater than a preset threshold; and calculating degree of difference Diff(i,j) between identical columns in two query patterns; two query patterns cannot be classified into the same class if the degree of difference between the columns is greater than the preset threshold.

Statistical rules: an eigenvector X(i)=(col1, col2, col3, . . . , colN, tab1, tab2, . . . , tabM) is calculated on the basis of all column information and table information in a query pattern, wherein, each colX represents the Score(X) of column Col(X), and each tabY represents the Score(Y) of table Tab(Y); then, clustering is performed for those eigenvectors with a clustering algorithm in unsupervised machine learning, and finally all of the query patterns are classified into several classes.

Learning rules: the result generated according to "static rules" and "statistical rules" is a recommended result, which may be adjusted or modified by the user after the classification result is obtained; for example, though some query patterns may be classified into the same class after they are judged according to "static rules" and "statistical rules", the user may modify the result manually so that they are not classified into the same class, in view of business requirements, etc. The "learning rules" stores all final classification results confirmed by the user, and use supervised machine learning to train an appropriate classification model, predict whether a set of patterns can be classified into a class, and adjust the clustering result on the basis of the result of prediction.

After all of the query patterns are classified into several classes, the classifier merges the plurality of query patterns in each class, according to the following rules:

calculating degree of difference Diff(i,j) between identical tables in two patterns; if the degree of difference is smaller than a preset threshold, it indicates that the two tables correspond to the same data table, and can be merged, and the Cat(m) after the merging is determined by a selection function FuncSelect( ), i.e., Cat(j)=FuncSelect(Cat(i),Cat (j)); the merged Score(m) is Score(m)=Score(i)+Score(j).

calculating degree of difference Diff(i,j) between identical columns in two patterns; if the degree of difference is smaller than a preset threshold, it indicates that the two columns correspond to the same column in the same data table and can be merged, and the Cat(m) after the merging is determined by a selection function FuncSelect( ), i.e., Cat(j)=FuncSelect(Cat(i),Cat(j)); the merged Score(m) is Score(m)=Score(i)+Score(j).

Finally, the structure formed after the query patterns in each class are merged contains a set of tables and their JOIN relation tree, and defines columns selected in each table. Such a structure is referred to as a pattern relation tree.

In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no contradiction between them.

While the present invention is described above in some preferred embodiments, the present invention is not limited to those preferred embodiments. Any modification, equivalent replacement, and improvement made without departing from the spirit and principle of the present invention shall be deemed as falling into the scope of protection of the present invention.

We claim:

1. An automatic modeling method for OLAP data model, comprising the steps of:
   S1. acquiring a SQL query statement;
   S2. parsing the SQL query statement and judging whether any syntax error or lexical error exists in the SQL query statement according to a parsing result;
   S3. extracting query structures from the SQL query statement according to column information and table information related with the source data used by the SQL query statement to obtain at least N sets of query patterns, if no syntax error or lexical error exists, where, N is a natural number greater than or equal to 1;
   S4. classifying said at least N sets of query patterns;
   S5. merging the query patterns in each class to obtain a corresponding pattern relation tree; and
   S6. converting the pattern relation tree into a corresponding data model,
   wherein the column information refers to all columns used in the SQL query statement,
   wherein each column comprises: name of column, table of column, type of column, and number of occurrences of the column,
   wherein the table information refers to all tables used in the SQL query statement,
   wherein each table comprises: name of table, type of table, and information on association between the table and a fact table,
   wherein the operation of classifying said at least N sets of query patterns in the step S4 comprises the steps of:
      S41: judging the differences between any two sets of query patterns among said at least N sets of query patterns according to static rules,
   wherein the static rules refer to:
      calculating a degree of difference between analogous tables in any two sets of query patterns and judging whether the degree of difference between analogous tables is greater than a first preset threshold, and the two sets of query patterns cannot be classified into the same class if the degree of difference between analogous tables is greater than the first preset threshold; and
      calculating a degree of difference between analogous columns in any two sets of query patterns and judging whether the degree of difference between analogous columns is greater than the first preset threshold after the degree of difference between analogous tables is calculated, and the two sets of query patterns can't be classified into the same class if the degree of difference between analogous columns is greater than the first preset threshold; and
      S42: performing clustering for said at least N sets of query patterns according to statistical rules and preset learning rules, after the differences are judged,
   wherein the operation of converting the pattern relation tree into a corresponding data model in the step S6 comprises the steps of:
      converting the table information in the pattern relation tree to corresponding table information in the data model; and
      converting the column information in the pattern relation tree into corresponding column information in the data model,
   wherein the operation of converting the column information in the pattern relation tree into corresponding column information in the data model further comprises the steps of:
      carrying out partitioned scoring of the columns in the pattern relation tree, to ascertain partitioned columns in the data model,
   wherein the partitioned scoring of the columns in the pattern relation tree is carried out with the following calculation formula:
   $PartScore(i)=PartFunc(Score(i), Stats(i))$, where, PartFunc( ) is the scoring function, Score(i) is the score of column (i) in each set of query patterns, Stats(i) is the characteristic statistical value of column (i), and, if the partitioned score PartScore(i) of column (i) exceeds a preset score threshold, the column (i) will be set as a partitioned column.

2. The method according to claim 1,
   wherein the operation of performing clustering of said at least N sets of query patterns according to statistical rules and preset learning rules in the step S42 comprises the steps of:
      S421: calculating an eigenvector of each set of query patterns according to column information and table information used in each set of query patterns; and
      S422: performing clustering of the eigenvectors according to a clustering algorithm in unsupervised machine learning and the preset learning rules.

3. The method according to claim 2,
   wherein the preset learning rules refer to:
      judging whether the clustering result meets preset criteria after the clustering,
      adjusting the clustering result with a supervised machine learning algorithm, and
      logging the adjusted clustering result if the clustering result doesn't meet the preset criteria.

4. The method according to claim 1,
   wherein the operation of merging the query patterns in each class to obtain a corresponding pattern relation tree in the step S5 comprises the steps of:
      calculating a degree of difference between analogous tables in any two sets of query patterns in each class and judging whether the degree of difference between analogous tables is smaller than a second preset threshold, and merging the two sets of query patterns to obtain a corresponding pattern relation tree if the degree of difference between analogous tables is smaller than the second preset threshold; and
      calculating a degree of difference between analogous columns in any two sets of query patterns in each class, judging whether the degree of difference between analogous columns is smaller than the second preset threshold, and merging the two sets of query patterns to obtain a corresponding pattern relation tree if the degree of difference between analogous columns is smaller than the second preset threshold, after the degree of difference between analogous tables in each class is calculated.

* * * * *